Figure 1:
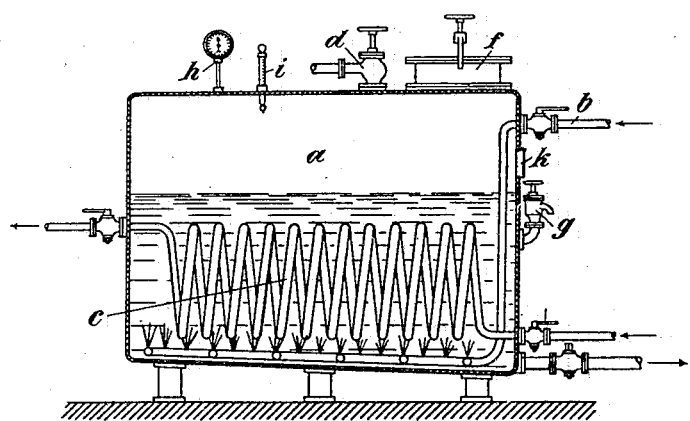

No. 766,271. PATENTED AUG. 2, 1904.
V. LAPP.
PROCESS OF CARRYING THROUGH THE FERMENTATION OF BOTTOM FERMENTED BEER UNDER PRESSURE.
APPLICATION FILED MAY 22, 1901.
NO MODEL.

Witnesses:
R. Lloyd Howland
Emma Hannisch

Inventor:
Valentin Lapp
by B. Singer atty.

No. 766,271. Patented August 2, 1904.

UNITED STATES PATENT OFFICE.

VALENTIN LAPP, OF LINDENAU, GERMANY.

PROCESS OF CARRYING THROUGH THE FERMENTATION OF BOTTOM-FERMENTED BEER UNDER PRESSURE.

SPECIFICATION forming part of Letters Patent No. 766,271, dated August 2, 1904.

Application filed May 22, 1901. Serial No. 61,417. (No specimens.)

*To all whom it may concern:*

Be it known that I, VALENTIN LAPP, brewer, a subject of the King of Saxony, residing at Lindenau, near Leipzig, in the Kingdom of Saxony, in the German Empire, have invented a new and useful Process of Carrying Through the Fermentation of Bottom-Fermented Beer under Pressure, of which the following is a specification.

The fermentation process of bottom-fermented beer, especially of superior kinds of such beer, was carried through hitherto at very low temperatures, generally below 10° centigrade. The comparatively small and open vessels usually employed do not allow, as a matter of course, of carrying through the fermenting process of superior kinds of beer at higher temperatures, although the fermenting process might well be carried through at temperatures of higher degrees provided this could be accomplished without the losses of desirable qualities—such as ethers, bouquets, aromas, carbonic acid, and the like—which occur during the fermentation of beer at such higher degrees in open vessels.

The process forming the subject-matter of the present invention allows of obtaining a quicker fermentation while preserving those ethers, bouquets, and aromas that characterize a genuine beer, the main point of the process being that the fermenting process is carried through at a temperature always exceeding 10° centigrade and only so much carbonic acid is allowed to escape as is advantageous or necessary for the respective product.

In carrying my improved process into effect I fill the closed fermenting vessel with beer having a temperature of from 12° to 15° centigrade. The yeast is added at the commencement of the filling, and the apparatus is then closed. Instantly thereafter the quantity of oxygen necessary for the fermentation is added in the form of liquid air which has lost by evaporation a part of its nitrogen, and contains consequently more oxygen than can be found in ordinary atmospheric air. That air is introduced into the fermenting beer, preferably by nozzles or by a spray, in such a manner that the beer is at the same time agitated, which is advantageous for the proper course of the fermentation.

The quantity of liquid air should be such that a pressure of from one-tenth to four-tenths of an atmosphere beyond atmospheric pressure is produced and maintained in the fermenting vessel; but as during the fermentation carbonic acid also is formed, a part of which must be expelled, the quantity of liquid air employed is more precisely such that the aforementioned pressure is maintained to compensate for the liquid air being consumed for expelling the carbonic acid. This expelling is generally repeated about every two hours or as often as found necessary. I have found by experience that one liter of liquid air should be employed for ten thousand liters of wort in twenty-four hours and that consequently one-twelfth of a liter of liquid air should be introduced into the wort every two hours, for twenty-four hours, at the end of which time the fermenting process may be completed.

The coöperation of the liquid air with the high temperature produces a more energetic oxidation and a better quicker carrying through of the fermenting process. On the other hand, the beer is prevented from becoming hot because the liquid air during expansion absorbs heat. This treatment of the beer causes a very energetic fermentation and can be accomplished in about one-fourth of the time required by the usual process.

With regard to the effect of the liquid air it should be borne in mind that the liquid air itself is acted upon by the heat produced by and during the fermentation. Owing to the energy of the fermentation, the heat produced is comparatively high—that is to say, would be comparatively high if it were not absorbed and tempered by the expanding liquid air. The liquid air is introduced only in such small quantities as are sufficient to keep the temperature of the beer from 12° to 15° centigrade, (one-twelfth of a liter every two hours.) The object of the liquid air is not only to cool the beer, but also to promote the fermentation, and this is due not to the presence of nitrogen, but to the presence of oxygen in the liquid air, care being taken that a great portion of the nitrogen has been removed from the liquid air by evaporation in order that the proportion of oxygen may be correspondingly greater. It is preferred that the evaporation of the nitrogen should be of such extent that the proportion of oxygen in the liquid air will be about fifty per cent. instead of about twenty-two per cent., or that of ordinary atmospheric air.

The surplus of the carbonic acid is driven out of the fermenting liquor partly by its own excess of pressure, partly by the injected liquid air, and is led away to a gasometer or the like. This is preferably accomplished by means of a kind of escape-valve located at the highest part or place of the fermenting vessel and adapted to be adjusted, according to the kind of beer to be produced, for a pressure of from 0.4 to one atmosphere above atmospheric pressure. In other words, the escape-valve is set at a pressure of from one-fifth of a pound to six pounds to the inch and so much liquid air is injected that the pressure is not less than one-fifth of a pound and not more than six pounds to the inch, according to the kind of beer to be produced. Ordinarily one-twelfth of a liter of liquid air is injected every two hours if ten thousand liters of wort are to be treated, as already stated.

If beer containing a small percentage of carbonic-acid gas is to be produced, the escape-valve is to be adjusted at a pressure of one-fifth of a pound to the square inch. If it is desired to produce a beer containing a great percentage of carbonic-acid gas, the escape-valve is set at a pressure of six pounds to the square inch. At various intermediate pressures between one-fifth of a pound and six pounds the beer will contain a corresponding percentage of carbonic-acid gas, as will be understood.

Preventing too great an accumulation of carbonic acid in the beer is important for the course of the fermenting process, especially during the advanced stages of the same, because this allows of carrying the process through in high and very large vessels in which the beer can form a large surface as well as a high column of liquid, and in which consequently great quantities of beer may be fermented at a time without there being too much carbonic acid retained in the beer in spite of the large surface. The injected liquid air drives the carbonic acid out of the beer in an upward direction, so that it may be led away through the aforementioned valve.

The highly-volatile products which escape during the slower process at a temperature of about 10° centigrade are preserved by my process, owing to the fact that the fermentation is carried on under pressure and in a short time, and such volatile products are desirable in the finished product.

When the main fermentation is finished, the beer is at once and under pressure cooled so far down as to get the temperature of the store-cellar and is led from the closed fermenting vessels to the store-cellar without any loss of carbonic acid, whereas by previous methods there is a material loss of the carbonic acid before the beer has been stored in the cellar.

Figure 2:
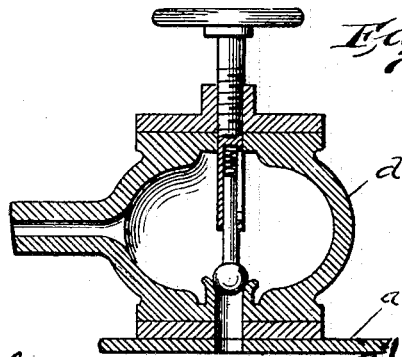

In the accompanying drawings, Figure 1 is a vertical section of an apparatus such as I may employ in carrying out my process. Fig. 2 is an enlarged vertical section of the escape-valve.

A vertical section through a fermenting vessel of the kind I prefer is shown in the accompanying drawings. Said vessel consists of a container $a$, having preferably the shape of the frustum of a cone, all the walls of which, as well as the bottom and the top, are sufficiently reinforced. Said container or vessel is provided with a pipe $b$, through which compressed air may be introduced with a coil $c$ for leading a heating or cooling medium through the beer and with a valve $d$ for leading away the carbonic acid. This valve is preferably an escape-valve, which may be adjusted for a certain pressure, as before stated, so that the carbonic acid automatically escapes as soon as a pressure exceeding a predetermined amount occurs. The vessel $a$ is further provided with a manhole $f$, serving for introducing the beer and for adding yeast, and with a test-cock $g$, a manometer $h$, a thermometer $i$, and windows $k$.

Having now described my invention, what I desire to secure by a patent of the United States is—

1. The process of carrying through the fermentation of bottom-fermented beer in closed vessels under pressure, consisting in carrying the fermenting process through at a temperature between 15° centigrade and 10° centigrade, and keeping the fermenting beer at such a temperature by introducing liquid air, for the purpose as described.

2. The process of carrying through the fermentation of bottom-fermented beer in closed vessels under pressure, consisting in carrying the fermenting process through at a temperature always between 15° centigrade and 10° centigrade, and keeping the fermenting beer at such a temperature by introducing liquid air having lost part of its nitrogen, for the purpose as described.

3. The process of carrying through the fermentation of bottom-fermented beer in closed vessels under pressure, consisting in carrying the fermenting process through at a temperature between 10° and 15° centigrade, keeping the fermenting beer at such a temperature, and introducing small quantities of liquid air at different times, thus increasing the energy of the fermentation and shortening the period of the process, substantially as described.

In witness whereof I have hereunto set my hand in presence of two witnesses.

VALENTIN LAPP.

Witnesses:
 RUDOLPH FRICKE,
 CHAS. J. BURT.